(12) United States Patent
Lerner

(10) Patent No.: US 10,171,444 B1
(45) Date of Patent: *Jan. 1, 2019

(54) SECURITIZATION OF TEMPORAL DIGITAL COMMUNICATIONS VIA AUTHENTICATION AND VALIDATION FOR WIRELESS USER AND ACCESS DEVICES

(71) Applicant: Daniel Maurice Lerner, Missouri City, TX (US)

(72) Inventor: Daniel Maurice Lerner, Missouri City, TX (US)

(73) Assignee: IronClad Encryption Corporation, Houston, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/005,134

(22) Filed: Jun. 11, 2018

Related U.S. Application Data

(63) Continuation-in-part of application No. 16/005,040, filed on Jun. 11, 2018.
(Continued)

(51) Int. Cl.
*H04L 29/06* (2006.01)
*H04W 12/06* (2009.01)
(Continued)

(52) U.S. Cl.
CPC ........ *H04L 63/08* (2013.01); *G06F 17/30283* (2013.01); *H04L 9/14* (2013.01);
(Continued)

(58) Field of Classification Search
CPC ...................................................... H04L 63/08
See application file for complete search history.

(56) References Cited

U.S. PATENT DOCUMENTS 4,558,176 A * 12/1985 Arnold .................... G06F 21/10
380/29
4,578,530 A 3/1986 Zeidler
(Continued)

OTHER PUBLICATIONS

Rafaeli et al.; A survey of key management for secure group communication; Published in: Journal ACM Computing Surveys (CSUR) Surveys Homepage archive; vol. 35 Issue 3, Sep. 2003; ACM Digital Library (Year: 2003) (Year: 2003).*
(Continued)

*Primary Examiner* — Bradley Holder
(74) *Attorney, Agent, or Firm* — Guerry L. Grune; ePatentManager.com

(57) ABSTRACT

An access control system and associated devices are described that conceal and securitize data transmissions between one or more secure databases for various user devices to ensure proper entrance or access into secure locations by approved personnel only. Specific methods and devices for securing (primarily digital and normally two-way) communications using applications that combine securing communications for wireless/cellular phones with personnel access card readers for entry into secure locations are also described. These combined communication and access devices require using specific encryption techniques that cannot be corrupted and are essential to denying fraudulent or otherwise unauthorized personnel the ability to enter or access security protected devices or locations.

30 Claims, 3 Drawing Sheets

Related U.S. Application Data

(60) Provisional application No. 62/518,337, filed on Jun. 12, 2017, provisional application No. 62/518,281, filed on Jun. 12, 2017.

(51) Int. Cl.
*G06F 17/30* (2006.01)
*H04L 9/14* (2006.01)

(52) U.S. Cl.
CPC .......... *H04L 63/0876* (2013.01); *H04L 63/20* (2013.01); *H04W 12/06* (2013.01)

(56) References Cited

U.S. PATENT DOCUMENTS

| | | | | |
|---|---|---|---|---|
| 4,665,396 | A * | 5/1987 | Dieleman | G06Q 20/341 |
| | | | | 235/382 |
| 5,446,880 | A * | 8/1995 | Balgeman | G06F 17/30569 |
| 5,825,890 | A | 10/1998 | Elgamal et al. | |
| 6,917,974 | B1 * | 7/2005 | Stytz | H04L 63/04 |
| | | | | 709/225 |
| 6,959,086 | B2 | 10/2005 | Ober et al. | |
| 6,996,723 | B1 * | 2/2006 | Kyojima | H04L 9/0822 |
| | | | | 380/45 |
| 7,032,240 | B1 * | 4/2006 | Cronce | G06F 21/34 |
| | | | | 705/51 |
| 7,181,016 | B2 | 2/2007 | Cross et al. | |
| 7,382,883 | B2 | 6/2008 | Cross et al. | |
| 7,660,422 | B2 * | 2/2010 | Mitchell | H04L 9/083 |
| | | | | 380/277 |
| 8,462,955 | B2 | 6/2013 | Ureche et al. | |
| 8,825,999 | B2 | 9/2014 | Mohamed | |
| 9,094,191 | B2 | 7/2015 | Avanzi et al. | |
| 9,213,858 | B2 | 12/2015 | Sharma et al. | |
| 9,465,953 | B2 | 10/2016 | Shasrma et al. | |
| 9,521,123 | B2 | 12/2016 | Jueneman et al. | |
| 9,703,985 | B1 | 7/2017 | Sanchez | |
| 2002/0124177 | A1 * | 9/2002 | Harper | G06F 21/6245 |
| | | | | 713/189 |
| 2004/0022222 | A1 * | 2/2004 | Clisham | H04L 69/18 |
| | | | | 370/338 |
| 2005/0047600 | A1 * | 3/2005 | Newkirk | H04W 12/04 |
| | | | | 380/278 |
| 2005/0069139 | A1 * | 3/2005 | Higurashi | G06F 21/10 |
| | | | | 380/284 |
| 2005/0201564 | A1 * | 9/2005 | Kayashima | H04L 9/0891 |
| | | | | 380/283 |
| 2006/0233371 | A1 * | 10/2006 | Sowa | H04L 9/0822 |
| | | | | 380/248 |
| 2006/0235852 | A1 * | 10/2006 | Gaug | G06F 17/30545 |
| 2006/0258296 | A1 * | 11/2006 | Steer | G01S 7/021 |
| | | | | 455/67.13 |
| 2012/0198538 | A1 | 8/2012 | Spring et al. | |
| 2012/0314867 | A1 * | 12/2012 | Tomaru | H04L 9/08 |
| | | | | 380/270 |
| 2013/0276067 | A1 | 10/2013 | Goyal et al. | |
| 2014/0237562 | A1 | 8/2014 | Nandakumar | |
| 2015/0195089 | A1 * | 7/2015 | Yajima | H04L 9/0869 |
| | | | | 380/46 |
| 2016/0358397 | A1 | 12/2016 | Kristensen et al. | |
| 2017/0012642 | A1 | 1/2017 | Declercq et al. | |
| 2017/0140175 | A1 * | 5/2017 | Angus | G06F 21/602 |

OTHER PUBLICATIONS

Papadimitratos et al.; Secure data communication in mobile ad hoc networks; Published in: IEEE Journal on Selected Areas in Communications ( vol. 24, Issue: 2, Feb. 2006 ); pp. 343-356; IEEE Xplore (Year: 2006).*

Russ, Eran. International Search Report. Israel Patent Office, dated Aug. 30, 2018, Jerusalem, Israel.

Russ, Eran. Written Opinion of the International Searching Authority. Israel Patent Office, dated Aug. 30, 2018, Jerusalem, Israel.

* cited by examiner

SECURITIZATION OF TEMPORAL DIGITAL COMMUNICATIONS VIA AUTHENTICATION AND VALIDATION FOR WIRELESS USER AND ACCESS DEVICES

PRIORITY STATEMENT

This application is a nonprovisional conversion of and takes priority from the US Provisional application entitled "Securitizing Temporal Digital Communications Via Authentication and Validation for Wireless User and Access Devices" with Ser. No. 62/518,337, filed Jun. 12, 2017.

This application is also a continuation-in-part of U.S. Nonprovisional application Ser. No. 16/005,040, filed Jun. 11, 2018 and entitled "Securitization of Temporal Digital Communications with Authentication and Validation of User and Access Devices", which is a nonprovisional conversion of US Provisional Application entitled "A System for Securing and Encrypting Temporal Digital Communications with Authentication and Validation of User and Access Devices" with Ser. No. 62/518,281 filed Jun. 12, 2017.

FIELD OF THE INVENTION

The present disclosure relates to the security of communications, and more particularly to a system that securitizes signals between one or more secure databases for personal security cards either in combination with or between cellular phones to ensure proper entrance or access into secure locations by only approved personnel. Methods and devices for securing (primarily digital and normally two-way) communications using applications that combine securing those communications for wireless/cellular phones with personnel access card readers (or other devices designed to receive security clearance for entry into secure locations) are not yet well established. These combined communication and access devices require using specific techniques essential to denying fraudulent or otherwise unauthorized personnel with the ability to enter or access security protected devices or secure locations.

BACKGROUND

Access control systems such as personnel security cards to limit access to enclosed areas such as buildings, rooms within buildings, or fenced-in regions to only those personnel who have permission to enter are often employed. Conventional access control systems include access card readers at doors of the secured building. People who have permission to enter the building are often provided with an access control card that can be read by access card readers. The card reader reads information from the card, and transmits the information to a control panel, which determines whether the entrance (such as a door) should be unlocked. If the door should be unlocked (i.e., the card is associated with a person who has permission to enter), the control panel then sends a signal to the locking mechanism of the door, causing it to unlock.

Conventional access control systems have several drawbacks and fail to take advantage of more recent and advanced technologies.

For example, many conventional systems utilize radio frequency identification devices (RFIDs) for identification of the personal security card to the access control system. The access card reader includes an RFID transceiver, and the access card includes an RFID tag or transponder. The RFID transceiver transmits a radio frequency query to the card as the card passes over it. The transponder includes a silicon chip and an antenna that enables the card to receive and respond to the RF query. The response is typically an RF signal that includes a pre-programmed identification (ID) number. The card reader receives the signal and transmits the ID number to the control panel via a wire connection. Conventional card readers are not very sophisticated. These card readers may perform some basic formatting of the identification data prior to sending it to the control panel, but are generally unable to perform more sophisticated functions with regard to securing digital communications.

The control panel is typically mounted on a wall somewhere in the building. The control panel conventionally includes a bank of relays that are each controlled by a controller device. The controller device accesses memory to determine whether the identification number received from the card reader is recognized and valid. If so, the controller causes the associated relay to open (or close) and thereby sends a signal to the door lock, which, if the signal is proper, causes the lock to enter the unlocked state. The lock typically remains unlocked for a specified amount of time.

Conventional control panels also have several deficiencies. In many instances, control panels consume a relatively large amount of space in relation to the number of doors they control. A control panel typically includes a specified number of relay banks, with each bank uniquely associated with the door it controls. For example, a control panel may have eight relay banks to control eight doors. Such a control panel could easily take up a 2 square foot area when mounted on a wall. If more than eight doors need to be controlled, then an additional control panel must be installed.

In addition, the "closed" architecture of conventional control panels make them inflexible, costly to maintain, and not user friendly. The closed architecture of the conventional control panels means that their design, functionality, and specifications are not disclosed by the manufacturers or owners. In addition, the control panel design is typically very complex, and specialized for a particular purpose, which renders them inaccessible by a typical building owner who has no specialized knowledge. As a result, when a control panel fails or needs to be upgraded, the building owner must call a specialized technician to perform maintenance or upgrading. The monetary costs associated with a technician's services contribute to excessive maintenance costs. In addition, a great deal of time is wasted waiting for the service technician to arrive.

Specific security concerns for cellular phones often deal with the content of the communication itself (often protected by encryption methods), the integrity of the communication (often protected by error-checking and anti-virus software), and authorized access to the communication (often protected by account codes and passwords). For the purposes of this application the definition of mobile or smart phones is as follows;

A mobile phone is a portable telephone that can make and receive calls over a radio frequency link while the user is moving within a telephone service area. The radio frequency link establishes a connection to the switching systems of a mobile phone operator, which provides access to the public switched telephone network (PSTN). Most modern mobile telephone services use a cellular network architecture, and, therefore, mobile telephones are often also referred to as cellular telephones or cell phones. In addition to telephony, $21^{st}$ century era mobile phones support a variety of other services, such as text messaging, MMS, email, Internet access, short-range wireless communications (infrared, Bluetooth), business applications, gaming, and digital photography. Mobile phones which offer these and more general computing capabilities are referred to within this disclosure as "smartphones".

Computer and associated cellular phone networks have been compromised by determining authorized account codes and passwords, thereby gaining access to proprietary two-way communications for obtaining information and additional capabilities. Attempts to combat these unauthorized communications has taken many forms. Interception of two-way communications of private (and often individual) conversations by government agencies has become commonplace.

One security measure implemented in typical communication systems is the authentication of communicating devices at registration, initiation or reception of the communication. Authentication is viewed as the process of confirming the identity of the communicating device, perhaps by transmission and reception of an account or identification code and a password. In applications where the communicating device is mobile, authentication often requires communication between or through a plurality of communicating devices or networks in order to verify the identity of the communicating device and often the user of the communicating device.

Another serious flaw with existing cellular telephone systems is referred to as the "false mobile station" syndrome. It is presently possible to copy the entire memory contents of a mobile station and to use that information to manufacture clones that can demand and receive service from the network. Cellular phones may be cloned by reading the entire memory contents of the phone, including its identification codes, "secret" keys, internally stored personal identification codes, signatures, etc., and writing the same codes into any number of similar "clone" phones. The cloning procedure can become quite sophisticated and may include software modifications which replace physically stored information with electronically stored information so that a number of stored mobile station identities may be cyclically rotated within one fraudulent mobile station and used to imitate several authentic mobile stations.

Many communication systems, including cellular telephone networks and personnel security cards having authentication or authorization systems and comprise a vast number of distributed communicating devices that transmit data to a central computer system. The central communication system is in charge of determining whether to allow the communication to go through or not. The central computer system may execute an authorization algorithm to determine if the security card has a valid account or identification number, if there is an available bio-identifier for the individual and, perhaps, if a valid personal identification number has been given or entered. However, sophisticated "hackers" have been able to duplicate valid identification numbers and determine one or more personal identification numbers.

Password protection provides a limited degree of security, primarily protecting a communication from access by persons who casually encounter the file, but this security can also be violated. Encryption is perhaps the most secure means for preventing outsiders from obtaining the content of the communication and, therefore, is in widespread use by corporations throughout the world for many or all of their electronic transactions.

However, the security of even the most sophisticated encryption methods remains jeopardized by the growing computing power available to individuals and groups. Complex encryption algorithms using 64 bit keys having $2^{64}$ (about $1.8 \times 10^{19}$) possible keys can become marginalized in terms of protection against outside access to the communication.

Therefore, there is a need for improved methods of securing communications between two or more communicating devices and/or users. More particularly, there is a need for devices and methods to ensure prevention of personnel security cards and cellular phones as well the content of the communication. Having a cellular or "smart" phone (smart phones are also those that have embedded memory and microprocessors) that combines security card-type access together with secured cellular phones to ensure proper secured access to users is also important. It would also be desirable to provide devices with a method for a simple measure of detecting the use of "cloned" communicating devices. Furthermore, it would be especially desirable if the method did not require any significant physical modifications to existing communicating devices, but rather are employed by the addition or modification of software.

To solve the above mentioned problems and drawbacks, the inventions disclosed in U.S. Pat. Nos. 6,466,780, 6,766, 161, and 6,466,780 and the associated details are hereby incorporated by reference into the present disclosure in its entirety and for all proper purposes.

SUMMARY

The present disclosure provides the ability to secure digital communications for the authorization and authentication of cellular phones together with personnel security cards by combing these devices and using a unique software encryption technique. More specifically, the present disclosure provides for one or more devices comprising a real or virtual master distributed auto-synchronous array (DASA) database located within or external to the one or more devices that at least stores and retrieves data and that includes at least two or more partial distributed auto-synchronous array (DASA) databases wherein the partial DASA databases function in either an independent manner, a collaborative manner or both, and wherein the master and partial DASA databases allow for bi-directional transmission of data to and from multiple partial user devices, to and from multiple partial access devices or to and from both partial user and partial access devices, wherein one or more partial user and partial access devices store and provide at least partial copies of portions of the master DASA database and wherein the master DASA database, the partial DASA databases or both partial and master DASA databases are linked and communicate with each other as well as one or more logging and monitoring databases capable of statistical and numerical calculations utilizing the data, wherein the tools authenticate using a first set of computing operations, validates using a second set of computing operations, and wherein a third set of computing operations controls access for a specified set of users, wherein the computing operations define rules utilized to provide logic with regard to communications between master and partial DASA databases and partial user and partial access devices.

In addition, the devices further operate by transmission of a credential identifier to an access control server when the devices are determined to be operating, a local authentication processor configured to authenticate said credential identifier against entries of one or more keys existing within tables when said access control system is determined to be operating and a input/output processor configured to send a signal to a secured area when said credential identifier has been successfully authenticated; wherein said communication transceiver includes an interface to serve second data that can be displayed to both a user external to said access control devices and displayed on said access control devices themselves.

The data is transmitted to a secured area such that the data is transmitted and received by a cellular phone. If access is allowed, a user's device provides use of oral, visual, or text data on a display, as a message that indicates a match so that the user(s) are allowed access.

If access is denied, the user's device provides use of an oral, visual, or text data on a display as a message of denial of the match indicating that the user is denied access.

Denial of the match causes an encryption application on the user's device to be removed and to ensure that master keys in a user table are secured, a new master key in the user table is generated either via a signal from the user's device to one or more secured encryption databases or via a signal from a key management system to one or more secured encryption databases.

The key management system is a system that provides one or more keys for encryption or decryption or both encryption and decryption as required by the devices.

The devices control access to an enclosed area from a group consisting of a building, a room within a building, a cabinet, a parking lot, a fenced-in region, and an elevator.

In addition, the embodiments can include a signal converter coupled to a communication module that is capable of receiving and transmitting data as signals, wherein the communication module is agnostic to a communication protocol of an access control server that is also a portion of the devices. The signal converter is agnostic to a communication protocol of a local authentication processor and the signal converter is adapted to interface with a plurality of access controllers.

In an additional embodiment, a communication transceiver is provided for the partial user device or the partial access device or both and includes at least one of the group consisting of; a serial interface, a TCP/IP interface, an IEEE 802.11 interface, an IEEE 802.15.4 interface, and a secure HTTP interface.

The communication transceiver is configured to transmit a credential identifier to access a control server via a wireless communication link. Here, the communication transceiver can receive the credential identifier from a radio-frequency identification (RFID) transponder included in an access control card.

In a further embodiment, operational modes of the devices include at least one of a synchronous mode and an asynchronous mode.

Further embodiments provide for data transmitted to an access control server that is encrypted.

In addition, a credential identifier can be transmitted to an access control server via a wireless communication link.

In another directly related embodiment to all those described in detail above, the disclosure also provides for a ubiquitous access control system comprising; a real or virtual master distributed auto-synchronous array (DASA) database located within or external to the access control system that at least stores and retrieves data and that includes at least two or more partial distributed auto-synchronous array (DASA) databases wherein the partial DASA databases function in either an independent manner, a collaborative manner or both, and wherein the master and partial DASA databases allow for bi-directional transmission of data to and from one or more partial user devices, to and from one or more partial access devices or to and from both partial user and partial access devices, wherein the partial devices store and provide at least partial copies of portions of the master DASA database and wherein the master DASA database, the partial DASA databases or both master and partial databases, are linked and communicate with each other as well as with one or more logging and monitoring databases capable of statistical and numerical calculations utilizing the data, wherein the one or more devices authenticate using a first set of computing operations, validates using a second set of computing operations, and wherein a third set of computing operations controls access for a specified set of users, wherein the computing operations define rules utilized to provide logic with regard to communications between master and partial DASA databases and partial user and partial access devices.

In order to further clarify one embodiment of the invention using a cellular phone, the user must download application (app) that requires fingerprints (or other/additional individual biomarkers) which must be subsequently validated. The user must then provide a user ID entry and verifies this against a user table to determine if this user is a valid registered UID (user identification). Once this has been properly established, an encryption application is employed to "build" a master key. Next, the master key is sent to a user table via a secure database. The combination of the user ID and the master key are then stored within a storage system (such as a memory chip within the cellular phone or transmitted subsequently or directly into a cloud-based memory system external to the cellular phone). Finally, an installation app message is received by the cellular phone prompting the user to either close or finalize the installation application.

DETAILED DESCRIPTION

Figure 1:
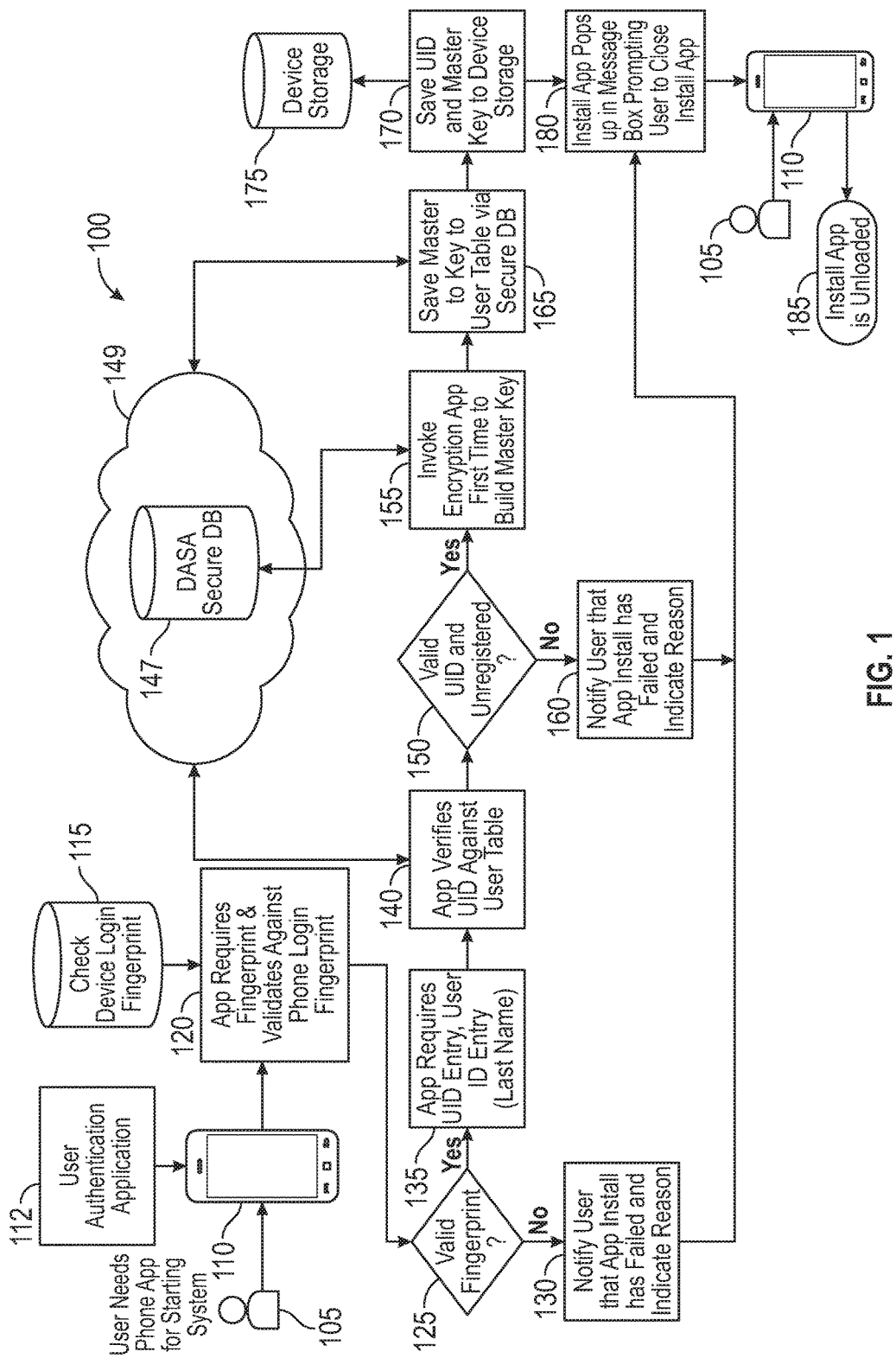
FIG. 1 is a flow chart describing the installation of a user authentication application for a user onto a cellular/smart phone.

While the foregoing discussion has dealt primarily with detecting unauthorized communicating devices, the present invention may also include the ability to detect unauthorized users. In many applications, including credit card authorization and approval and cellular telephone communications, it is frequently desirable to verify that the communication is being initiated by an authorized user. The inclusion of a user authorization system is beneficial for reducing the use of authentic communicating devices when they have been stolen or lost. Losses due to the use of lost or stolen communicating devices is also very significant, but is inherently limited to the capacity of the authorized communicating device itself, i.e., one communication at a time, a credit limit, etc. Furthermore, the use of lost or stolen communicating devices by unauthorized users may be restricted by the use of user specific codes, such as a personal identification number (PIN), finger print, password, voice commands and the like.

In another aspect of the invention, the host device and/or the communicating device may be programmed to verify the identity and authenticity of the device alone or in combination with the user. In one example, the host computer may first verify that the communication is being initiated from an authorized communicating device, then prompt the user to enter a personal identification code (PIN) indicating that the user is also authorized. Only upon satisfaction of these two criteria is the communication to be allowed to proceed. It should be recognized that the host device could be programmed to verify these two codes, or other additional codes and authorizations, in any order. In another example, the communicating device itself may require the successful input of a personal identification code prior to enabling or energizing the transaction specific code, any portion of the device identification code or even some portion of the communication itself.

A still further aspect of the invention provides for automatic re-synchronization of the transaction specific codes following one or more unauthorized communications. Re-synchronization methods according to the present disclosure may be achieved by programming the host device to reset the a pointer or designated portion within a database regarding transaction specific (TS) codes for a particular identification code upon receiving a series of attempted communications having a series of transaction specific (TS) codes that match a portion of the database. For example, after receiving an attempted communication having a transaction specific (TS) code that is not the next expected transaction specific (TS) code or within the range of tolerance, no further communications using the same identification code can proceed until the transaction specific codes of the communicating device and the host are re-synchronized. If the host device is programmed to allow re-synchronization after receiving three transaction specific codes (i.e., 12, 13, 14) that match a portion of the host database (i.e., 10, 11, 12, 13, 14, 15, 16, etc.) for the given identification code, then the pointer in the host database is reset for the next TS code (i.e., 15) in the database. Subsequent communications may proceed in accordance with the aforementioned methods. It may be beneficial to a separate range of tolerance for re-synchronization in order to prevent re-synchronization at a dramatically different point in the sequence of transaction specific codes.

FIG. 1 is a flow chart (100) describing the installation of a user authentication application (112) for a user onto a cellular/smart phone in accordance with the present invention. More specifically, the system provides for a user (105) to operate a secured cellular ("smart") phone (110). The user (105) must download an application (app) (120) from a device that provides a check on a fingerprint (or other bio-identifier) (115). These devices require fingerprints (or other/additional individual biomarkers) which must be subsequently validated (125). When the fingerprint is not valid, the user (105) is notified (130) and is prompted to close the install application (180) which is unloaded (185). In the case where the fingerprint is validated, the user (105) must then provide a user ID (UID) entry (135). This UID entry (135) must be verified against a user table (140) which resides within one or more secured distributed auto-synchronous array databases (DASA), (147) to determine if this user is a valid registered UID (150). The DASA database can exist in one or more stand-alone storage devices, computers, computer related clouds, the world-wide-web (internet), intranet, and/or servers (149). In the case when the user (105) fails to validate, the user is notified (160) and the application is unloaded (180, 185).

When the user (105) is validated, an encryption application within the DASA database (147) is employed to "build" a master key (155). Next, the master key is sent to a user table (165) via the secured DASA database (147). The combination of the user ID and the master key (170) are then stored within a storage system (175) (such as a memory chip within the cellular phone or transmitted subsequently or directly into a cloud-based memory system external to the cellular phone). Finally, an installation application (app) message is received and displayed (180) by the cellular phone (110), prompting the user (105) to finalize the installation application onto the cellular phone (110) for the user (105). The user app is subsequently unloaded (185).

Figure 2:
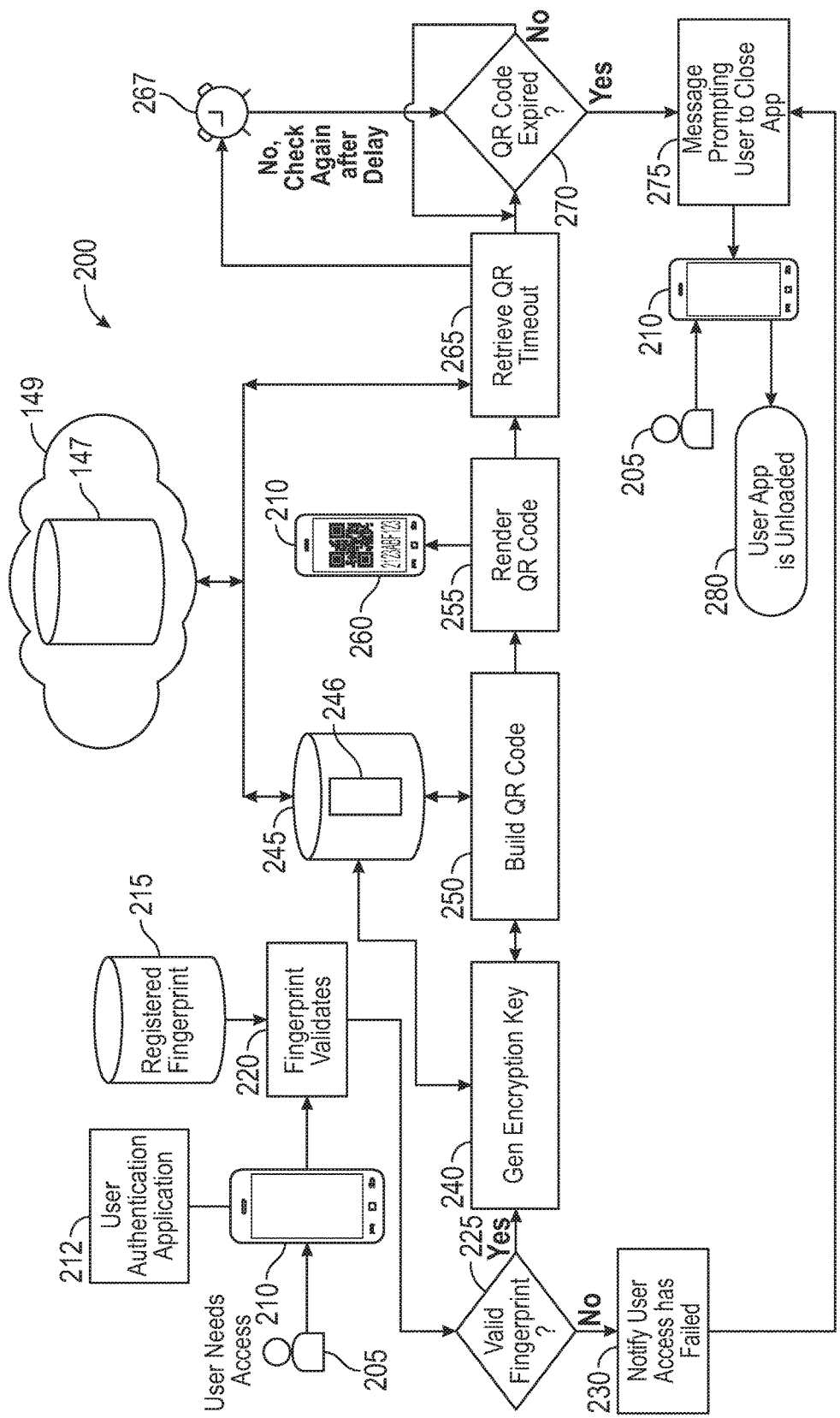
FIG. 2 is a flow chart describing the use of an authentication application that creates a user credential such as a QR code onto a cellular/smart phone.

FIG. 2 is a flow chart (200) describing the use of an authentication application that creates a user credential such as a QR code onto a cellular/smart phone in accordance with the present invention. More specifically the system is for a user (205) that needs access through a secured door (or entrance) and in this instance invokes the use of the user authentication application (212), (which corresponds to (112) in FIG. 1) onto an encrypted cellular phone (210). The user (205) activates the user authentication application (212) from the cellular phone (210) which provides a check on a fingerprint (or any other bio-identifier) (215) that requires fingerprints (or other/additional individual biomarkers) which must be subsequently validated (220). If determination of validity (225) fails (230), the user (205) is notified (230) with a message (275) prompting the user (205) to close the application (212) and the application is subsequently unloaded (280).

The storage device (245) contains records with at least one user record (246) residing within the DASA database (147). When determination of fingerprint validation (225) is confirmed, then an encryption key (240) is generated, utilizing information in the user record (246), of the DASA database (147), residing in storage device (245). In this instance, a QR code is built (250) utilizing the encryption key (240) and information in the user record (246). The QR code(s) function as a "superset" of synchronous transaction specific codes (TS codes) within the DASA database (147) user record(s) (246). More specifically, the QR codes contain all the functionality of the TS codes plus additional specific metadata pertaining to items such as; user temporal information, location, and historical usage. The QR codes utilized in this specific instance, can themselves be encrypted with one or more levels of encryption.

Next, the QR code is rendered for display (255) onto the cellular phone (210) via a "user friendly" text derivation that changes the cellular phone into a "smarter" phone (260) in that it now has a QR identifier residing on the phone (210). The QR code timeout threshold (265) is retrieved from a configuration table also held within the records (246) of the DASA database (147). Next, a clock (267) is preset with this timeout (265). The clock (267) is to check to determine if the delay between the start time and end time is properly achieved regarding whether or not the generation of a new QR code has expired (270). If the QR code has not expired it can be used to match that of the receiving portion of the security system described below. If the QR code has expired, then the user application (app) (212) provides a message that is displayed (275) on the cellular phone (210), prompting the user to close the app which is subsequently unloaded (280).

Figure 3:
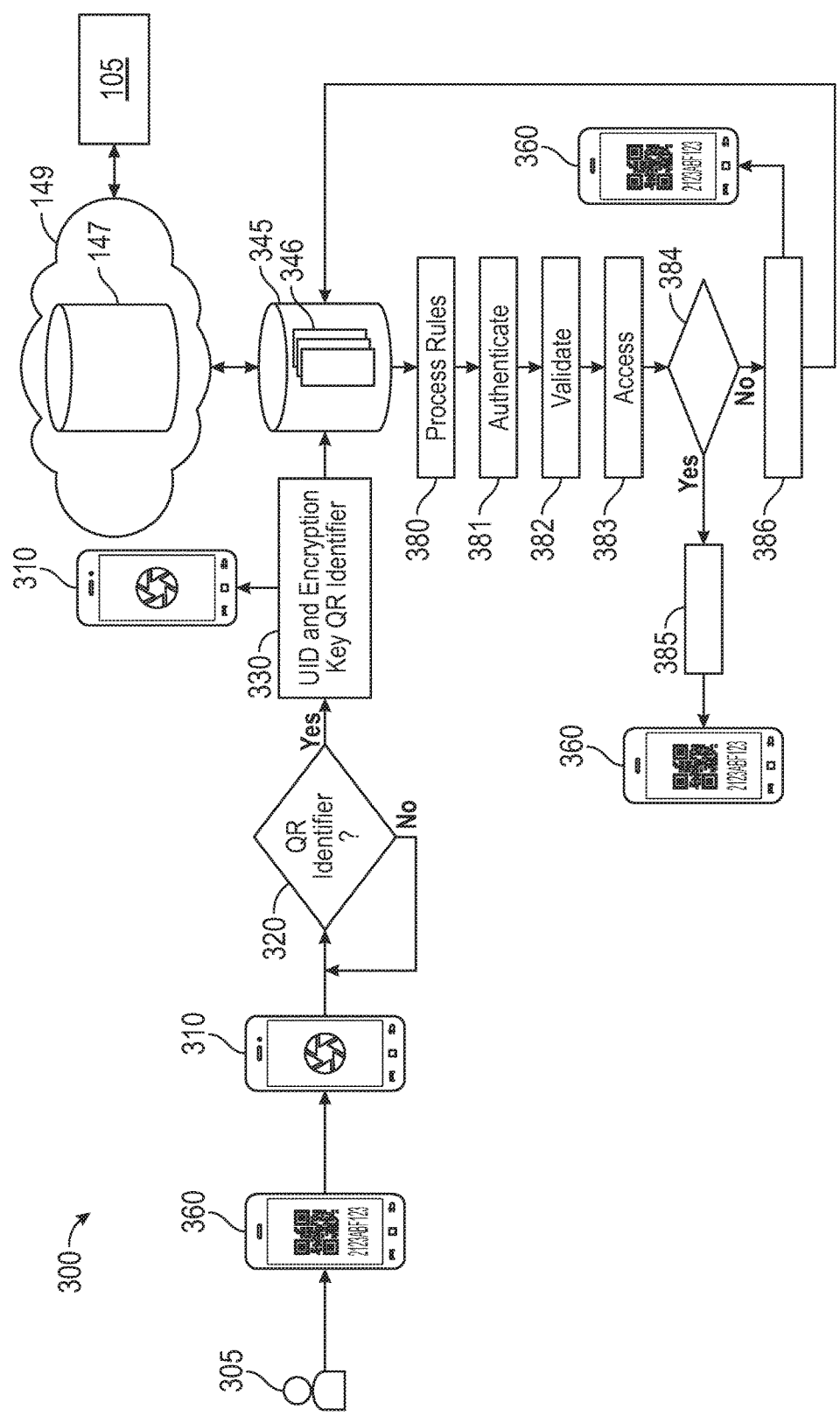
FIG. 3 is a flow chart describing the access process for a user with an authenticated credential.

FIG. 3 is a flow chart (300) describing the access process for a user (305) with an authenticated credential. The authenticated credential in this instance are one or more QR codes. The system utilizes two separate devices. The user device which is a smarter cell phone (360) and displays a QR code and corresponds to (260) in FIG. 2. The other device is an access device that has been installed in a cellular phone (310) but can also be a card reader for entrance into a secured location.

More specifically, the user (305) that needs access through a secured door (or entrance) in this instance invokes the use of the smarter cell phone displaying a QR identifier (360). This smarter phone (360) is then pointed toward access device (310). In this specific instance, the access device is a cellular phone (310) that includes a camera or other detecting technique that is operating by searching for a QR identifier. If the QR identifier is found (320) then the next step is to acquire a User Identification (UID) and encryption key embedded in the QR identifier (330). Simultaneously (or within a short time interval), the access device (310) sends an oral verbal/text/data message displayed or specifically stated as "attempting access".

The DASA database (147) contains secured access information that resides in the records (346) of the storage device (345) and employs a set of process rules (380) that are followed to authenticate (381), validate (382) and determine access (383) for the access device (310). There can be, and often are, different rules that should be followed for other access devices. The flow path provided indicates that the access device(s) authenticates (381) using a first set of rules, validates (382) using a second set of rules, and includes a third set of rules that controls access (383) using data that has been supplied by the user device (in this case the smarter cell phone (360)) that ensures access to only the authenticated and validated set of users under specified conditions.

The process rules are finalized with an access decision (384) which includes at least two options. One option is an access decision that includes the process of allowing user access (385) with the smarter cell phone (360) and verifies the user (305) has invoked its privileges. In this instance this includes physical access such as opening doors or otherwise gaining entrance to secured areas. This equally applies to gaining logical access such as unlocking data within databases or communication systems. The user (305) is alerted when the system allows access by displaying a message on the access device (360). The user's activity is monitored by the access process (385) to ensure that they have utilized their access within certain limitations. Physical limitations may be provided by enabling door monitoring switches, floor-mats, man traps, video analysis, etc. Logical limitations may be monitored by keyboard and/or data access and the like. Temporal limitations may be employed as required. Access may further be limited by counting the number of access egress or access egress attempts. In the case of access denial (386), the user will normally be notified of the denial of access by a displayed message on access device (360) and optional alarming may take place. Reporting of the activity is normally returned from the access device (360) to the storage device (345) containing records (346) which are synchronized to the DASA database (147), which also provides for logging the data, meta-data, and associated information to the external logging and monitoring database (105).

In a further aspect of the invention protecting the security of cellular/smart phone, the security of any transmitting/receiving (transceiving) of signals of the cellular/smart phone with other devices, as well as protection of the acquisition of the QR codes are all accomplished by the use of the encryption techniques described above.

In another aspect of the invention, this electronically generated bit or any number of electronically generated bits may be provided to indicate other information about the use of the card, such as an excessive number of attempts to enter the personal identification code. Other uses for additional electronically generated bits will become apparent in particular applications.

While most of the foregoing discussion about the present encryption technique has focused on the use of databases, lists and tables for storing transaction specific codes, it may be preferred in some applications having limited memory to provide an algorithm for calculating the next transaction specific code. In these applications, the pointer refers to the number of steps into the algorithm or the value input into the algorithm and the transaction specific code is the calculated output of the algorithm. The cellular/smart phone and QR code generator are provided with the same algorithm and compares the transaction specific code received from the communicating device with the next expected transaction specific code. The concept of "tolerance" described earlier may be incorporated either by setting an acceptable range of values for the transaction specific code (output of the algorithm) or the pointer itself (input to the algorithm), the latter being the equivalent of back calculating the pointer and verifying that it is within the range of tolerance.

While the foregoing is directed to the preferred embodiment of the present invention, other and further embodiments of the invention may be devised without departing from the basic scope thereof, and the scope thereof is determined by the claims which follow.

While most of the foregoing discussion about the present encryption technique has focused on the use of databases, lists and tables for storing transaction specific codes, it may be preferred in some applications having limited memory to provide an algorithm for calculating the next transaction specific code. The concept of "tolerance" described earlier may be incorporated either by setting an acceptable range of values for the transaction specific code (output of the algorithm) or the designated portion itself (input to the algorithm), the latter being the equivalent of back calculating the designated portion and verifying that it is within the range of tolerance.

The computer readable media described within this application is non-transitory. In most if not all cases, the transmission of data is transmitted via signals that are non-transitory signals.

The signals are generated via at least one form of energy selected from one or more of the group consisting of; electrical, optical, mechanical, chemical, magnetic, radiative, electro-optical, electro-mechanical, electrochemical and electro-magnetic energy.

Each and every aspect of both Provisional Applications are hereby fully incorporated by reference.

In addition, all references mentioned herein are hereby incorporated by reference in their entirety.

In compliance with the patent laws, the subject matter disclosed herein has been described in language more or less specific as to structural and methodical features. However, the scope of protection sought is to be limited only by the following claims, given their broadest possible interpretations. The claims are not to be limited by the specific features shown and described, as the description above only discloses example embodiments. While the foregoing is directed to preferred embodiments of the present invention, other and further embodiments of the invention may be devised without departing from the basic scope thereof, and the scope thereof is determined by the claims which follow.

I claim:

1. One or more access devices or one or more user devices or both one or more access devices and one or more user devices comprising: at least one computer processing unit (CPU) with computational capabilities that is connected to and controls a computer memory via an address bus and a data bus where said address bus accesses a designated range of computer memories and range of memory bits and said data bus provides a flow of transmission(s) into and out of said CPU and computer memory; one or more real or one or more virtual master distributed auto-synchronous array (DASA) databases or both one or more real and one or more virtual master distributed auto-synchronous array (DASA) databases located within or external to said access devices and said user devices, where said master (DASA) databases at least store and retrieve data and also include at least two or more partial distributed auto-synchronous array (DASA) databases, wherein said partial DASA databases function in either an independent manner, a collaborative manner or both an independent manner and a collaborative manner, wherein said master and said partial DASA databases analyze and provide information in a form of data and act to control one or more output devices, wherein said output devices are computing devices, wherein said one or more output devices create user devices, and wherein said master and said partial DASA databases configure bi-directional transmission of data to and from multiple partial user devices, to and from multiple partial access devices or to and from both multiple partial user and multiple partial access devices, wherein said user devices and said access devices are computing devices, and wherein one or more partial user and one or more partial access devices store and provide at least partial copies of portions of said master DASA databases, and wherein said master DASA databases, said partial DASA databases or both said partial DASA databases and said master DASA databases are linked and communicate with each other as well as inclusion of one or more logging and monitoring databases that provide statistical and numerical calculations utilizing data, wherein said one or more access devices authenticate using a first set of computing operations, and validate using a second set of computing operations, and wherein a third set of computing operations controls access for a specified set of users, wherein said computing operations define rules utilized to provide logic with regard to communications between said master and said partial DASA databases and said partial user and said partial access devices.

2. The one or more access devices and user devices of claim 1, wherein said one or more access devices and user devices further operate by transmission of a credential identifier to an access control server when said one or more access devices and user devices are determined to be operating, with a local authentication processor configured to authenticate said credential identifier against entries of one or more keys existing within tables when an access control system is determined to be operating, and including an input/output processor configured to send a signal to a secured area when said credential identifier has been successfully authenticated; wherein a communication transceiver includes an interface to serve data that can be displayed to both a user external to access control devices and also displayed on said access control devices themselves.

3. The one or more access devices and user devices of claim 2, wherein data is transmitted to a secured area, where said data transmitted to a secured area is transmitted and received by a cellular phone.

4. The one or more access devices and user devices of claim 3, wherein if access is denied, a user's device provides use of oral, visual, or text data on a display, as a message of denial of a match indicating that a user possessing said user's device is denied access.

5. The one or more access devices and user devices of claim 4, wherein denial of said match causes an encryption application on said user's device to be removed and wherein to ensure that master keys in a user table are secured, a new master key in said user table is generated either via a signal from said user's device to one or more secured encryption databases or via a signal from a key management system, with at least one computing device, to said one or more secured encryption databases.

6. The one or more access devices and user devices of claim 2, wherein if access is allowed, a user's device provides use of oral, visual, or text data on a display, as a message that indicates a match where a user possessing said user's device is allowed access.

7. The one or more access devices and user devices of claim 1, wherein a key management system, with at least one computing device, is a system that provides one or more keys for encryption or decryption or both encryption and decryption as required by said one or more access devices and user devices.

8. The one or more access devices and user devices of claim 1, wherein said one or more access devices and user devices control access to an enclosed area from a group consisting of a building, a room within a building, a cabinet, a parking lot, a fenced-in region, and an elevator.

9. The one or more access devices and user devices of claim 1, further comprising a signal converter coupled to a communication module, said signal converter provides reception and transmission of data as signals, wherein said communication module is agnostic to a communication protocol of an access control server that is also a portion of said one or more access devices and user devices.

10. The one or more access devices and user devices of claim 9, wherein said signal converter is agnostic to a communication protocol of a local authentication processor.

11. The one or more access devices and user devices of claim 10, wherein said signal converter interfaces with a plurality of access controllers.

12. The one or more access devices and user devices of claim 10, wherein a communication transceiver is provided for said partial user device or said partial access device or said partial user device and said partial access device and includes at least one of the group consisting of: a serial interface, a TCP/IP interface, an IEEE 802.11 interface, an IEEE 802.15.4 interface, and a secure HTTP interface.

13. The one or more access devices and user devices of claim 10, wherein a communication transceiver is configured to transmit a credential identifier to access a control server via a wireless communication link.

14. The one or more access devices and user devices of claim 13, wherein said communication transceiver receives said credential identifier from a radio-frequency identification (RFID) transponder included in an access control card.

15. The one or more access devices and user devices of claim 10, wherein data transmitted to an access control server is encrypted.

16. The one or more access devices and user devices of claim 1, wherein operational modes of said one or more access devices and user devices include at least one of a synchronous mode and an asynchronous mode.

17. The one or more access devices and user devices of claim 1, wherein a credential identifier is transmitted to an access control server via a wireless communication link.

18. An access control system that employs one or more real or one or more virtual master distributed auto-synchronous array (DASA) databases or both one or more real and one or more virtual master distributed auto-synchronous array (DASA) databases, comprising: one or more access devices or one or more user devices or both one or more access devices and one or more user devices further comprising: at least one computer processing unit (CPU) with computational capabilities that is connected to and controls a computer memory via an address bus and a data bus where said address bus accesses a designated range of computer memories and range of memory bits and said data bus provides a flow of transmission(s) into and out of said CPU and computer memory; said one or more real or said one or more virtual master distributed auto-synchronous array (DASA) databases or both said one or more real and said one or more virtual master distributed auto-synchronous array (DASA) databases located within or external to said access devices and said user devices, where said master (DASA) databases at least store and retrieve data and also include at least two or more partial distributed auto-synchronous array (DASA) databases, wherein said partial DASA databases function in either an independent manner, a collaborative manner or both an independent manner and a collaborative manner, wherein said master and said partial DASA databases analyze and provide information in a form of data and act to control one or more output devices, wherein said output devices are computing devices, wherein said one or more output devices create user devices, and wherein said master and said partial DASA databases configure bi-directional transmission of data to and from multiple partial user devices, to and from multiple partial access devices or to and from both multiple partial user and multiple partial access devices, wherein said user devices and said access devices are computing devices, and wherein one or more partial user and one or more partial access devices store and provide at least partial copies of portions of said master DASA databases, and wherein said master DASA databases, said partial DASA databases or both said partial DASA databases and said master DASA databases are linked and communicate with each other as well as inclusion of one or more logging and monitoring databases that provide statistical and numerical calculations utilizing data, wherein said one or more access devices authenticate using a first set of computing operations, and validate using a second set of computing operations, and wherein a third set of computing operations controls access for a specified set of users, wherein said computing operations define rules utilized to provide logic with regard to communications between said master and said partial DASA databases and said partial user and said partial access devices.

19. The access control system of claim 18, wherein said one or more access devices and user devices further operate by transmission of a credential identifier to an access control server when said access control system is determined to be operating, with a local authentication processor configured to authenticate said credential identifier against entries of one or more keys existing within tables when said access control system is determined to be operating and including an input/output processor configured to send a signal to a secured area when said credential identifier has been successfully authenticated; wherein a communication transceiver includes an interface to serve data that can be displayed to both a user external to access control devices and also displayed on said access control devices themselves.

20. The access control system of claim 19, wherein data is transmitted to a secured area, where said data transmitted to a secured area is transmitted and received by a cellular phone.

21. The access control system of claim 19, wherein if access is allowed, a user's device provides use of oral, visual, or text data on a display, as a message that indicates a match where a user possessing said user's device is allowed access.

22. The access control system of claim 21, wherein if access is denied, said user's device provides use of oral, visual, or text data on a display, as a message of denial of said match indicating that said user possessing said user's device is denied access.

23. The access control system of claim 22, wherein denial of said match causes an encryption application on said user's device to be removed and wherein to ensure that master keys in a user table are secured, a new master key in said user table is generated either via a signal from said user's device to one or more secured encryption databases or via a signal from a key management system, with at least one computing device, to said one or more secured encryption databases.

24. The access control system of claim 23, wherein said key management system is a system that provides one or more keys for encryption or decryption or both encryption and decryption as required by said access control system.

25. The access control system of claim 18, wherein said access control system controls access to an enclosed area from a group consisting of a building, a room within a building, a cabinet, a parking lot, a fenced-in region, and an elevator.

26. The access control system of claim 18, further comprising a signal converter coupled to a communication module, said signal converter provides reception and transmission of data as signals, wherein said communication module is agnostic to a communication protocol of an access control server that is also a portion of said access control system and wherein data transmitted to said access control server is encrypted.

27. The access control system of claim 26, wherein said signal converter is agnostic to a communication protocol of a local authentication processor and wherein said signal converter interfaces with a plurality of access controllers.

28. The access control system of claim 26, wherein a communication transceiver is provided for said partial user device or said partial access device or said partial user device and said partial access device and includes at least one of the group consisting of: a serial interface, a TCP/IP interface, an IEEE 802.11 interface, an IEEE 802.15.4 interface, and a secure HTTP interface and wherein said communication transceiver is configured to transmit a credential identifier to access a control server via a wireless communication link.

29. The access control system of claim 28, wherein said communication transceiver receives said credential identifier from a radio-frequency identification (RFID) transponder included in an access control card.

30. The access control system of claim 18, wherein operational modes of said access control system include at least one of a synchronous mode and an asynchronous mode and wherein a credential identifier is transmitted to an access control server via a wireless communication link.

* * * * *